ically permitting passage of ambient air therethrough. The apertures of the triangular portions and of the base portions and of the outer end walls are further provided with flap-type valves which easily permit the ingress of ambient air into the ambient air chambers but permit only limited egress of the ambient air from the chambers upon pressurization thereof. The base portion is mounted on a vehicle body with the inlet communicating with a source of pressure fluid. In stored position, halves of the base portion and like portions of the frontal portion are respectively rolled upon themselves, or spaced edge portions of the base portion and of the frontal portion are folded upon themselves over a center portion. Upon communication of the inlet with the source of pressure fluid, the fluid inflates the passages and the manifold to move the base portion from stored position to a planar operative position over a backing portion of the vehicle body to preform the frontal portion prior to inflation thereof. Upon inflation of the tubes from the manifold, the frontal portion advances relative to the base portion to operative position. As the frontal portion advances, ambient air is drawn into the cushion through the apertures in the base portion and in the outer end walls.

United States Patent [19]
Fleck et al.

[11] 3,733,091
[45] May 15, 1973

[54] OCCUPANT RESTRAINT CUSHION

[75] Inventors: Lawrence L. Fleck, Warren; Robert Hickling, Royal Oak; Thomas J. Smalldon, Port Huron, all of Mich.

[73] Assignee: General Electric Corporation, Detroit, Mich.

[22] Filed: May 12, 1971

[21] Appl. No.: 142,537

[52] U.S. Cl. .................................... 280/150 AB
[51] Int. Cl. ........................................... B60r 21/10
[58] Field of Search .............. 280/150 AB, 150 B; 296/84 K; 5/347, 348; 244/138

[56] References Cited

UNITED STATES PATENTS

| | | | |
|---|---|---|---|
| 3,624,810 | 11/1971 | Hass | 280/150 AB |
| 2,974,912 | 3/1961 | Namsick | 244/138 |
| 1,266,482 | 5/1918 | Kamrass | 5/348 |
| 2,418,798 | 4/1947 | Whitmer | 280/150 AB X |
| 3,059,656 | 10/1962 | Seubert et al. | 5/348 X |
| 3,477,072 | 11/1969 | Frost | 5/348 |
| 3,650,223 | 3/1972 | Kobori | 5/348 X |

*Primary Examiner*—Kenneth H. Betts
*Attorney*—W. E. Finken and Herbert Furman

[57] ABSTRACT

An occupant restraint cushion includes a planar base portion having upper and lower walls secured at the edges thereof. The lower wall has a center inlet which is located at the intersection of inflatable linear passages terminating at an inflatable manifold extending around the periphery of the base portion. The passages and the manifold are formed by triangular portions of the upper and lower walls which are secured to each other in surface-to-surface relationship and provided with apertures. The cushion further includes a frontal portion which extends across the base portion and is secured at opposite edge portions thereof to opposite edges of the base portion. The frontal portion includes a number of adjacent interconnected inflatable tubes. Each tube communicates at the ends thereof with the manifold through openings in the upper wall of the base portion. Apertured intermediate and outer end walls extend between the tubes and the base portion to define ambient air chambers. The apertures of the walls and of the triangular portions are covered by porous material permitting passage of ambient air therethrough. The

12 Claims, 6 Drawing Figures

PATENTED MAY 15 1973

INVENTORS
Lawrence L. Fleck,
Robert Hickling &
BY Thomas J. Smalldon II

H. Furman
ATTORNEY

INVENTORS
Lawrence L. Fleck,
Robert Hickling &
Thomas J. Smalldon II
BY H. Furman
ATTORNEY

OCCUPANT RESTRAINT CUSHION

This invention relates generally to inflatable vehicle body occupant restraint cushions and more particularly to cushions of the type which are inflated by both pressure fluid and ambient air.

One feature of the cushion of this invention is that it includes a planar base portion and a frontal portion traversing the base portion and defining therewith an ambient air receiving chamber which is filled with ambient air upon movement of the frontal portion to an operative position relative to the base portion by pressure fluid.

Another feature is that the base portion is movable from a stored position to an operative planar position relative to a backing portion of a vehicle body by the pressure fluid and preforms the frontal portion prior to inflation and movement thereof to operative position by the pressure fluid.

A further feature is that the frontal portion includes a plurality of side-by-side interconnected tubular portions which advance relative to the base portion to operative position to draw ambient air into the ambient air receiving chamber which is defined by the tubular portions, the base portion and end walls interconnecting the base portion and the terminal tubular portions.

Yet another feature is that the base portion is stored in a nonplanar position and is moved to an operative position upon inflation of self-contained passages and a manifold therein by the pressure fluid.

Yet a further feature is that the tubular portions span the base portion and are inflated from the manifold to advance the tubular portions to operative position relative to the base portion.

These and other features of the cushion of the invention will be readily apparent from the following specification and drawings wherein.

Figure 1:
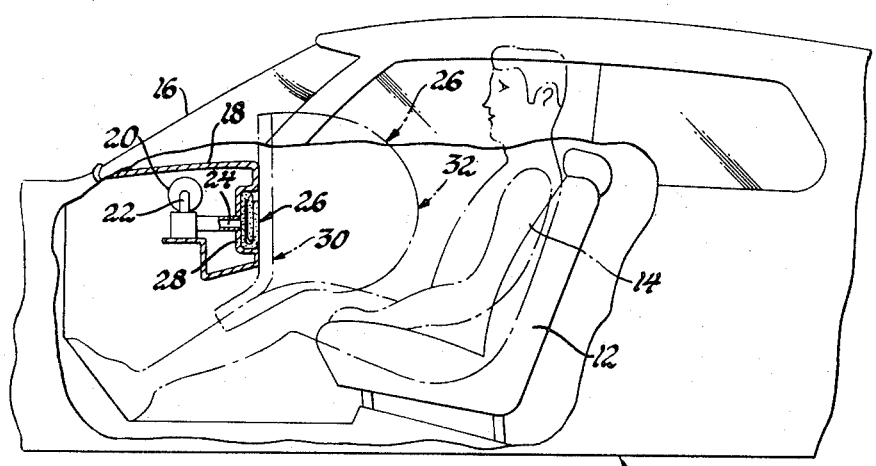
FIG. 1 is a partially broken away partial view of a portion of the vehicle body embodying an occupant resistant cushion according to this invention, with the cushion being shown in full lines in stored position and in phantom lines in operative position.

Referring now particularly to FIG. 1 of the drawings, a conventional vehicle body designated generally 10 includes a conventional front seat 12 which is adapted to support a phantom line indicated occupant 14 in seated attitude. The body 10 includes a windshield structure 16 and an instrument panel structure 18. Housed within the instrument panel structure 18 is a conventional occupant restraint system which includes a vessel 20 providing a source of pressure fluid and having an outlet sealed by a rupturable diaphragm and communicating with a manifold 22. A passage 24 communicates the manifold 22 with an inflatable occupant restraint cushion 26 according to this invention. The occupant restraint system and the manner in which the outlet of the vessel 20 is communicated with the manifold 22 are conventional and the details thereof are therefore not shown.

When in stored position, as shown in full lines, the cushion is located within a suitably formed housing or recess 28 of the instrument panel structure 18, and, when in operative position, as shown in phantom lines, the cushion extends outwardly or rearwardly with respect to the instrument panel structure 18 as wall as over such structure in order to be located in proper position for engagement by the occupant 14. The opening of the housing 28 may be closed by a suitable covering which normally closes such opening but is rupturable to allow the cushion 26 to move to operative position upon inflation thereof.

Figure 2:
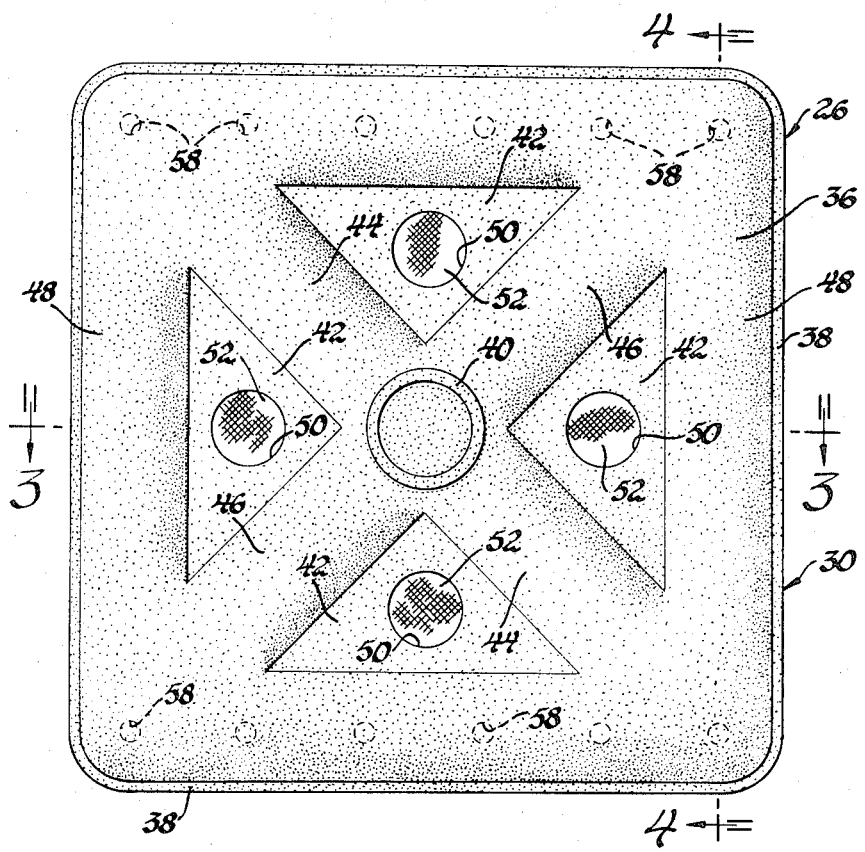
FIG. 2 is an enlarged bottom plan view of the cushion.
Figure 3:
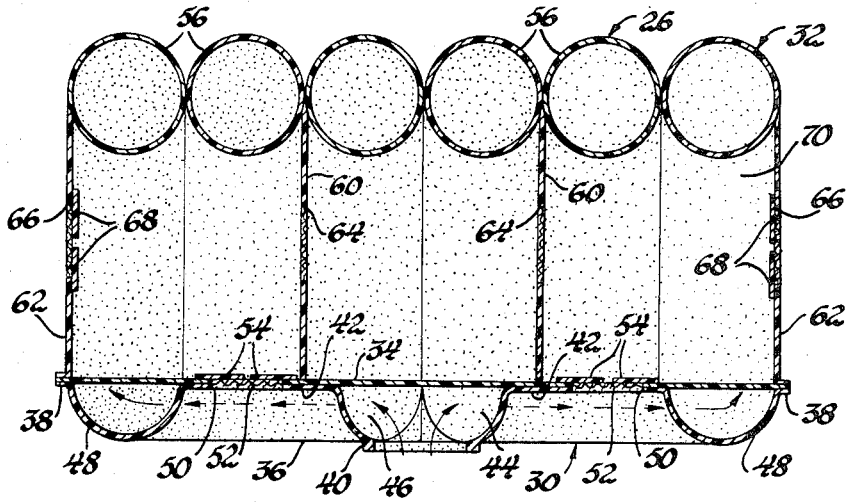
FIG. 3 is a sectional view taken generally along the plane indicated by line 3—3 of FIG. 2.

Referring now particularly to FIGS. 2 through 5 of the drawings, the cushion 26 generally includes a base portion 30 and a frontal portion 32. The base portion includes a planar upper wall 34 of suitable nonporous, flexible material, such as neoprene-coated dacron or nylon, and a lower wall 36 of like material. The upper and lower walls are generally of square shape as shown in FIG. 2 and the edges 38 of these walls are conventionally secured to each other such as by stitching. The lower wall 36 includes a center inlet or opening 40 which communicates with the passage 24 for inflation of the cushion as will be further described. Generally triangularly shaped portions 42 of the lower and upper walls are cemented or otherwise secured in surface-to-surface relationship, as shown in FIG. 3, to divide the interior of the chamber defined by the walls 34 and 36 into passages 44 and 46 intersecting at the inlet opening 40 and terminating at a peripheral manifold 48 extending entirely around the periphery of the base portion. An aperture or opening 50 is provided through each of the triangularly shaped portions 42 and covered by a disc of porous flexible material 52 secured to the portions 42 around the openings. A valve 54 is provided for each of the openings 50. As shown in FIG. 6, valve 54 includes a pair of semicircular flaps or segments of nonporous material which are stitched to portions 42 around openings 50 and are located on wall 34. The linear edges of the flaps are slightly separated. Upon the movement of air from the lower wall 36 through the openings 50 to the interior of the cushion, the flaps distend or move away from disc 52 to freely permit such movement. Upon the attempted movement of air from the upper wall 34 through the openings 50 and out through the lower wall 36, the flaps are pressed by the air pressure against the disc 52 and permit only limited flow of air from the interior of the cushion through the narrow openings defined by the linear edges of the flaps. Thus, although the flaps approach a one-way valve, it will be remembered that a limited egress or outlet of air from the interior of the cushion to the exterior thereof is permitted.

Figure 4:
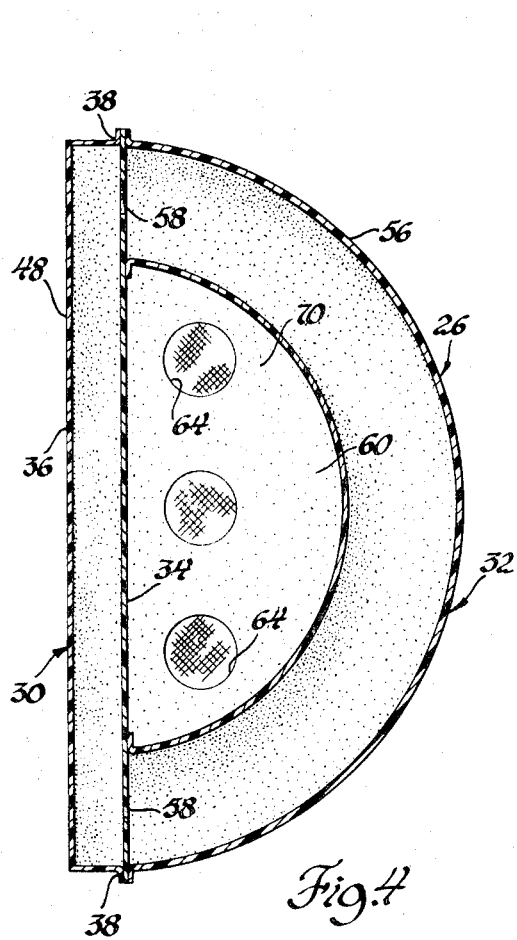
FIG. 4 is a sectional view taken generally along the plane indicated by line 4—4 of FIG. 2.

The frontal portion 32 includes a plurality of adjacent interconnected tubes or tubular portions 56 which span the base portion and have their open ends suitably secured to the upper wall 34 of the base portion such as by stitching, cementing or otherwise. The open ends of each of the tubes communicate with the manifold 48 through respective or individual openings 58 as shown in FIGS. 2 and 4. The tubes 56 may be conveniently provided by respective sheets of suitable nonporous fabric material, such as the same material used for walls 34 and 36, which are secured to each other along division lines. A pair of interior walls 60 extend between the junctions of certain of the tubes 56 and wall 34, and a pair of end walls 62 extend between the terminal tubes 56 and wall 34. Walls 60 and 62 are respectively provided with a plurality of openings 64 and 66 which are covered by discs of the same material as cover openings 50. The openings 66 are further provided with valves 68 which are the same as valves 54 and are provided on the interior of walls 62.

The tubes 56 and end walls 62 of the frontal portion 32 cooperate with the base portion 30 to define an ambient air receiving chamber 70. Walls 60 cooperate with walls 62 in dividing chamber 70 into end portions and an intermediate center portion. When the cushion 26 is in the stored position shown in FIG. 1, opposite thirds or edge portions of the cushion are folded upon themselves and upon a center third or intermediate portion. Alternatively, opposite halves of the cushion can be rolled upon themselves toward the center inlet 40. When the diaphragm of the vessel 20 is ruptured, either mechanically, explosively, or by fluid pressure, the pressure fluid flows into the manifold 22, then into the passage 24 and then to the inlet 40 of the cushion 26. As the pressure fluid enters the inlet 40, it flows through the passages 44 and 46 to the manifold 48. This inflates the passages and the manifold and expands or moves the base portion 30 from its stored position of FIG. 1 to its operative phantom line indicated position. It will be noted that this movement is generally laterally of the vehicle and away from the occupant 14 as compared to movement of the cushion longitudinally of the vehicle and towards such occupant. The movement of the base portion from stored to operative position, preforms the frontal portion 32 as the overlapping or rolled portions of the base portion unfold or unroll and move outwardly relative to each other.

Figure 5:
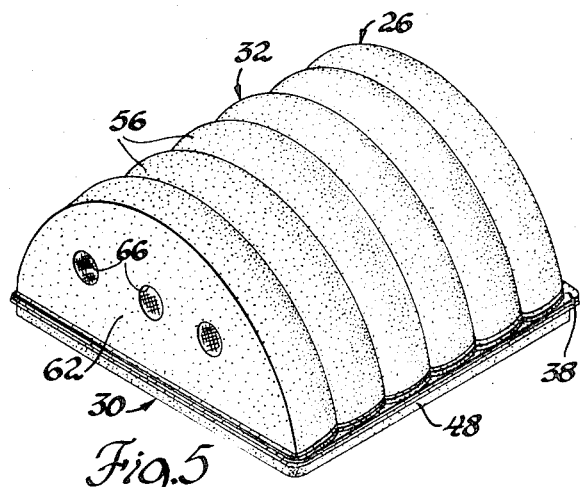
FIG. 5 is a perspective view of the cushion in operative position.
Figure 6:
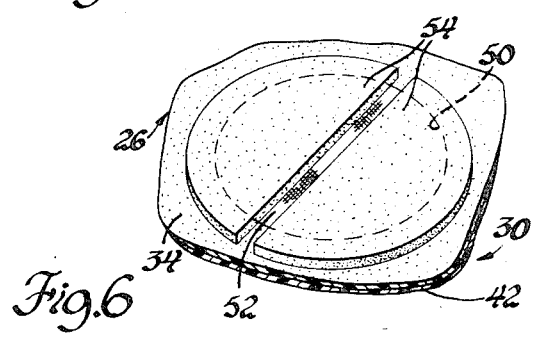
FIG. 6 is a view of a portion of FIG. 3.

Upon movement of the base portion to its operative position, the pressure fluid thereupon flows from the manifold 48 through the openings 58 and into the tubes 56 to inflate these tubes and advance or move the frontal portion 32 from its preformed position, wherein it is adjacent the base portion 30, to its operative position as shown in FIGS. 1, 3, and 5.

As the tubes 56 are inflated by the pressure fluid, the advancement or movement of the frontal portion 32 from its preformed position to its operative position automatically draws ambient air from the vehicle body into the interior of the cushion 26 initially through the openings 50 and then through openings 50 and 66. It will be recalled that these openings are closed by valves 54 and 68. Two of the valves 54 and valves 68 permit the movement of ambient air into the end portions of the ambient air chamber 70 and the other two valves 54 permit the movement of ambient air into the center portion of chamber 70. No valves are necessary for the openings 64 in walls 60 and the ambient air drawn into the cushion flows through these openings between the center and end portions of the ambient air chamber 70.

The interconnected tubes 56 stabilize the frontal portion against movement laterally of the base portion upon angular engagement of the frontal portion by the occupant 14. The tubes 56 reinforce each other and will resist any relative lateral movement upon such angular engagement. The walls 60 and 62 further reinforce the tubes against lateral movement relative to the base portion 30. Additionally, the walls 60 and 62 maintain the radius of the tubes 56 constant. This increases the resistance to distortion of the tubes upon inflation thereof and also upon impact by the occupant 14.

Should the occupant 14 engage the tubes 56, ambient air within the cushion will be expelled from the cushion through the valves 54 and 68 to absorb the energy of such impact. It will be recalled that these valves permit only a limited flow of air outwardly from the ambient air chamber 70 within the cushion. Within the cushion, air can flow between the end portions and the center portion of the ambient air chamber. The walls 60 and openings 64 restrict instantaneous flow of air between the center portion and the end portions as well as restricting sideways motion of the air to increase the energy absorption capability of the cushion.

Although a particular type of valve has been shown and described in conjunction with the portions 42 and walls 62, other types of valves which function in the same manner may be used with equal success. Likewise, it should be noted that it may be desirable to provide such a valve for each of the tubes 56 so that these tubes can dump pressure fluid during inflation and upon occupant impact to the ambient air chamber 70.

Thus, this invention provides an improved vehicle body occupant restraint cushion.

We claim:

1. In combination with a vehicle body and a source of pressure fluid, an occupant restraint cushion comprising, a generally planar flexible base portion of predetermined shape, means mounting the base portion on the body for movement from a stored nonplanar position to an operative planar position over an adjacent backing portion of the vehicle body, pressure fluid inlet means for the base portion communicable with the pressure fluid source, means within spaced peripheral edge portions of the base portion providing inflatable pressure fluid receiving manifold means, inflatable passage means within the base portion communicating the inlet means with the manifold means to move the peripheral edge portions relative to each other and move the base portion to operative position, an inflatable flexible frontal portion including a plurality of adjacent cooperative pressure fluid receiving compartments, traversing the base portion between the spaced peripheral edge portions thereof, means communicating the compartments with the manifold means to inflate the compartments and advance the frontal portion relative to the base portion intermediate the manifold means, wall means interconnecting the remaining edge portions of the base portion and the compartments and defining therewith an ambient air receiving chamber, and means within the wall means permitting the induction of ambient air within the ambient air receiving chamber upon inflation and advance of the frontal portion relative to the base portion.

2. In combination with a vehicle body and a source of pressure fluid, an occupant restraint cushion comprising, a generally planar flexible base portion of predetermined shape, means mounting the base portion on the body for movement from a non-planar stored position to an operative planar position over an adjacent backing portion of the vehicle body, pressure fluid inlet means for the base portion communicable with the pressure fluid source, means within spaced peripheral edge portions of the base portion providing inflatable pressure fluid receiving manifold means, inflatable passage means within the base portion communicating through the inlet means with the manifold means to move the spaced peripheral edge portion relative to each other and move the base portion to operative position, an inflatable flexible frontal portion including a plurality of laterally aligned interconnected inflatable tubular portions traversing the base portion between the spaced peripheral edge portions thereof, means communicating the tubular portions with the manifold means to inflate and advance the tubular portions relative to the base portion intermediate the manifold means, wall means interconnecting the remaining edge portions of the base portion and the tubular portions and defining therewith an ambient air receiving chamber, and means within the wall means permitting the induction of ambient air within the ambient air receiving chamber upon inflation and advance of the tubular portions relative to the base portion.

3. In combination with a vehicle body and a source of pressure fluid, an occupant restraint cushion comprising, a generally planar flexible base portion of predetermined shape, means mounting the base portion on the body for movement from a stored position to an operative planar position over an adjacent backing portion of the vehicle body, pressure fluid inlet means for the base portion communicable with the pressure fluid source, means within laterally spaced peripheral edge portions of the base portion providing inflatable pressure fluid receiving manifold means, inflatable passage means within the base portion communicating through the inlet means with the manifold means to move the spaced peripheral edge portion relative to each other to move the base portion to operative position, a plurality of arcuately shaped interconnected tubes traversing the base portion between the spaced peripheral edge portions thereof, means respectively communicating each tube with the manifold means to inflate the tubes to arcuate shape relative to the base portion, wall means interconnecting the base portion and the terminal tubes and defining therewith an ambient air receiving chamber, and valve means within the base portion and wall means permitting the induction of ambient air within the ambient air receiving chamber on inflation of the tubes relative to the base portion.

4. In a vehicle body having a source of pressure fluid, an occupant restraint cushion comprising, in combination, a mounting portion providing manifold means communicable with the pressure fluid source, an inflatable flexible frontal portion of arcuate shape laterally thereof and defined by arcuately shaped portions of a plurality of side-by-side directly interconnected pressure fluid receiving compartments extending in loop fashion from the mounting portion and mutually reinforcing each other against independent movement, means communicating the compartments with the manifold means for inflation of the compartments to arcuate shape and advancement of the frontal portion from a deflated position adjacent a portion of the body to an advanced inflated position relative thereto upon communication of the manifold means with the pressure fluid source, means closing the interior of the frontal portion to the ambient atmosphere and defining an ambient atmosphere receiving chamber with the frontal portion, means permitting the induction of ambient atmosphere into the chamber upon inflation and advancement of the frontal portion relative to the vehicle body, and means permitting the expulsion of ambient atmosphere from within the ambient air receiving chamber upon occupant impact with the frontal portion.

5. The combination recited in claim 4 wherein the arcuately shaped portions of the compartments are toroids joined laterally to each other.

6. The combination recited in claim 4 wherein the means closing the interior of the frontal portion include wall means extending from respective terminal pressure fluid receiving compartments, and the means permitting the induction of ambient atmosphere into the chamber include valve means in the wall means permitting the introduction of ambient atmosphere into the chamber and blocking expulsion of such ambient atmosphere so inducted.

7. The combination recited in claim 4 wherein the means communicating the compartments with the manifold means include pressure fluid inlet means respective to each of the compartments and commonly communicated with the source by the manifold means.

8. In combination with a vehicle body and a source of pressure fluid, an occupant restraint cushion comprising, a base portion of predetermined shaped including a central inlet communicating with the pressure fluid source and a plurality of inflatable passages extending from the inlet to the periphery of the base portion, a pressure fluid inflatable portion of arcuate shape spanning the base portion and communicating with the inflatable passages for inflation of the pressure fluid inflatable portion and advancement thereof relative to the base portion to an occupant engaging position, means cooperating with the base portion and pressure fluid inflatable portion to define an ambient atmosphere inflatable chamber within the pressure fluid inflatable portion, and means communicating the ambient atmosphere inflatable chamber with the ambient atmosphere through the base portion upon inflation and advancement of the pressure fluid inflatable portion.

9. The combination recited in claim 8 wherein the base portion is flexible and the inflatable passages are formed integral with the base portion.

10. The combination recited in claim 8 wherein the base portion includes a pair of planar sheets of flexible material secured to each other along predetermined lines, the unsecured areas within such lines providing the inflatable passages.

11. The combination recited in claim 8 wherein the base portion includes a pair of like-shaped planar sheets of flexible material secured to each other at predetermined areas jointly defining elongated unsecured areas providing the inflatable passages.

12. The combination recited in claim 11 wherein the inflatable passages cross each other at the central inlet.

* * * * *